US012345820B2

(12) United States Patent
Tsuji

(10) Patent No.: US 12,345,820 B2
(45) Date of Patent: Jul. 1, 2025

(54) MEASUREMENT CONTROL APPARATUS, MEASUREMENT SYSTEM, MEASUREMENT CONTROL METHOD, AND NON-TRANSITORY COMPUTER READABLE MEDIUM

(71) Applicant: NEC Corporation, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 435 days.

(21) Appl. No.: 17/781,553

(22) PCT Filed: Dec. 6, 2019

(86) PCT No.: PCT/JP2019/047730
§ 371 (c)(1),
(2) Date: Jun. 1, 2022

(87) PCT Pub. No.: WO2021/111609
PCT Pub. Date: Jun. 10, 2021

(65) Prior Publication Data
US 2022/0413153 A1    Dec. 29, 2022

(51) Int. Cl.
*G06T 7/11* (2017.01)
*G01S 17/894* (2020.01)

(52) U.S. Cl.
CPC ............ *G01S 17/894* (2020.01); *G06T 7/11* (2017.01); *G06T 2207/10028* (2013.01)

(58) Field of Classification Search
CPC .......... G01S 17/894; G01S 2007/4975; G01S 7/4808; G01S 17/42; G01S 7/497;
(Continued)

(56) References Cited

U.S. PATENT DOCUMENTS

2003/0071891 A1* 4/2003 Geng ................... H04N 23/63
348/E5.042
2005/0226464 A1* 10/2005 Sun ........................ G06T 7/20
382/103
(Continued)

FOREIGN PATENT DOCUMENTS

JP    H08-233519 A    9/1996
JP    H10-213650 A    8/1998
(Continued)

OTHER PUBLICATIONS

International Search Report for PCT Application No. PCT/JP2019/047730, mailed on Feb. 4, 2020.

*Primary Examiner* — Stephen P Coleman
(74) *Attorney, Agent, or Firm* — Sughrue Mion, PLLC

(57) ABSTRACT

A measurement control apparatus (10) according to the present disclosure includes: a detection unit (11) configured to detect an abnormal part of point group data acquired from a three-dimensional optical sensor; a control unit (12) configured to control the orientation of the three-dimensional optical sensor in accordance with the abnormal part detected by the detection unit (11); and a determination unit (13) configured to determine the case of the abnormality of the abnormal part detected by the detection unit (11) based on the point group data measured by the three-dimensional optical sensor in the orientation controlled by the control unit (12).

19 Claims, 17 Drawing Sheets

(58) Field of Classification Search
CPC . G01S 17/89; G06T 7/11; G06T 2207/10028; G06T 7/0004; G06T 7/50; G06T 2207/30168; G06T 2207/30184
USPC .......................................................... 382/103
See application file for complete search history.

(56) References Cited

U.S. PATENT DOCUMENTS

| | | | |
|---|---|---|---|
| 2014/0125813 A1* | 5/2014 | Holz | G06F 3/017 |
| | | | 348/169 |
| 2019/0164269 A1 | 5/2019 | Kläger et al. | |
| 2021/0279472 A1* | 9/2021 | Chuang | G06V 20/41 |

FOREIGN PATENT DOCUMENTS

| | | |
|---|---|---|
| JP | 2007-121175 A | 5/2007 |
| JP | 2010-019621 A | 1/2010 |
| JP | 2011-185764 A | 9/2011 |
| JP | 2015-010959 A | 1/2015 |
| JP | 2016-183877 A | 10/2016 |
| JP | 2017-053793 A | 3/2017 |
| JP | 2019-523424 A | 8/2019 |

* cited by examiner

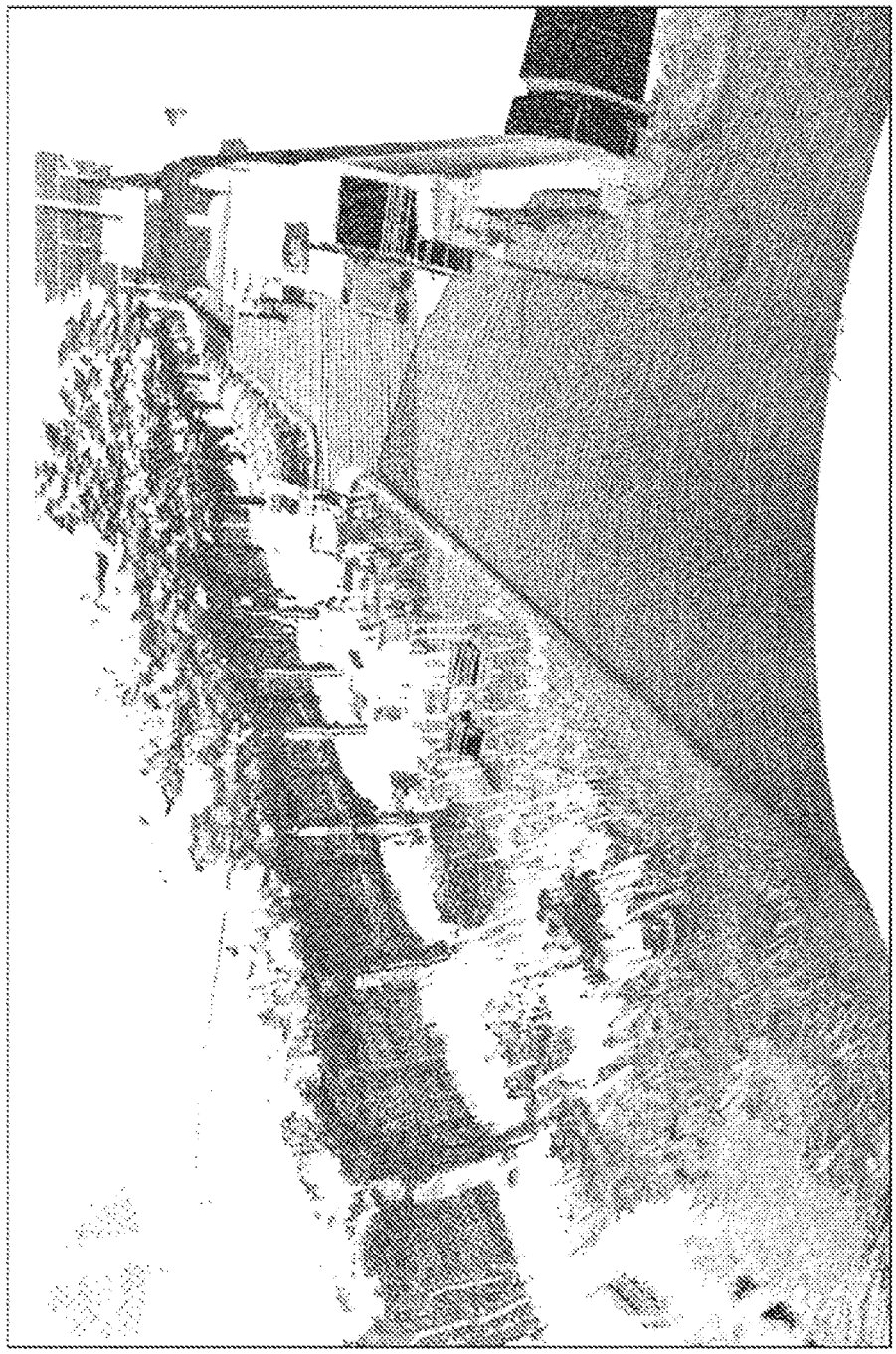
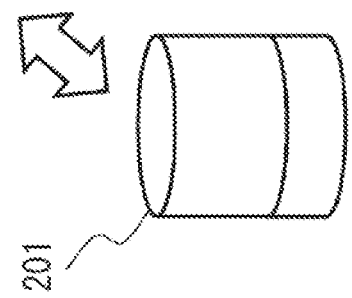
Fig. 10

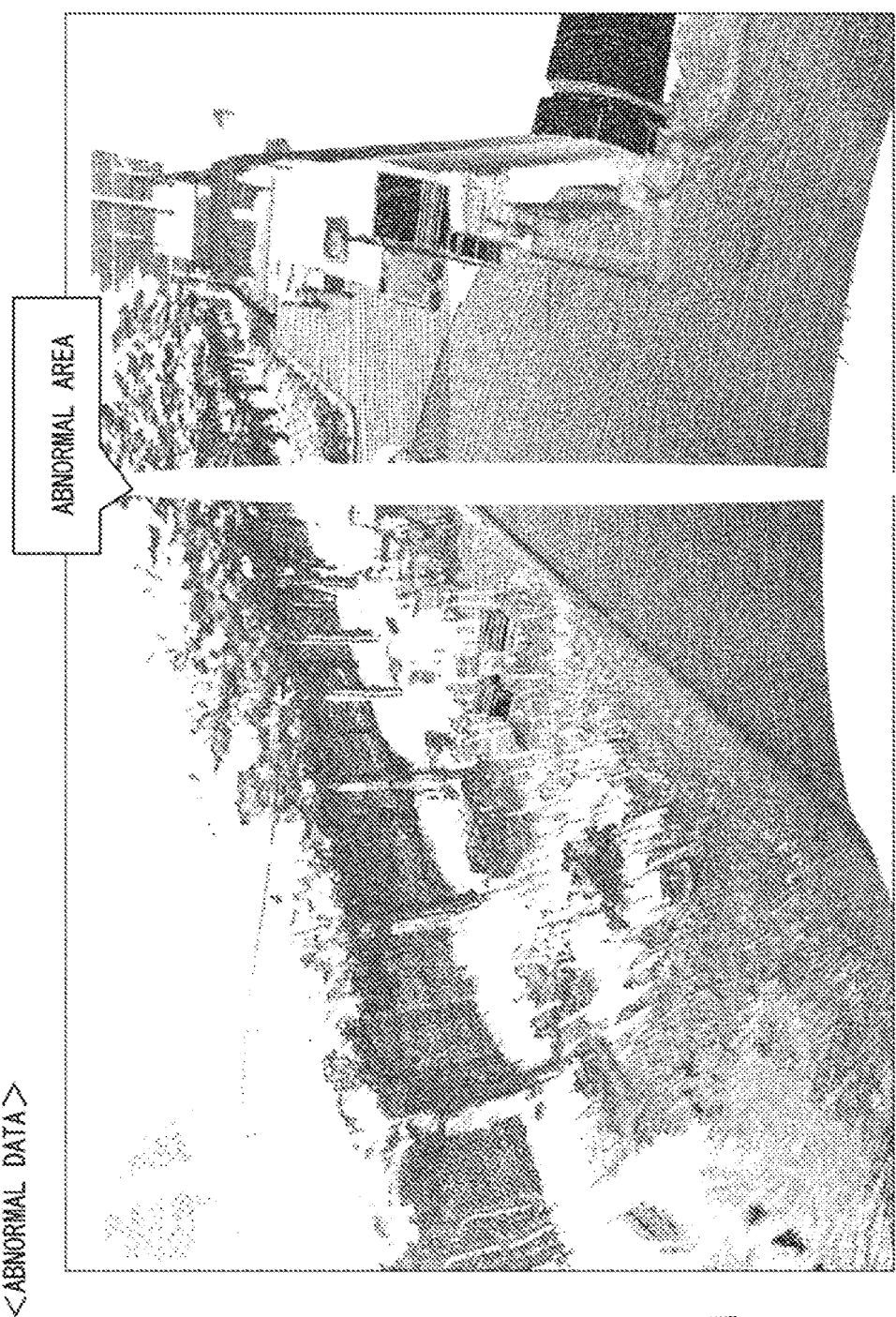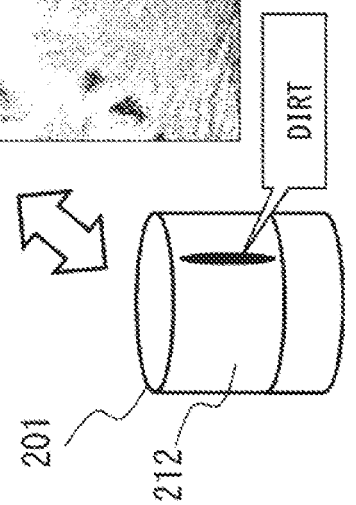
Fig. 11

MEASUREMENT CONTROL APPARATUS, MEASUREMENT SYSTEM, MEASUREMENT CONTROL METHOD, AND NON-TRANSITORY COMPUTER READABLE MEDIUM

This application is a National Stage Entry of PCT/JP2019/047730 filed on Dec. 6, 2019, the contents of all of which are incorporated herein by reference, in their entirety.

TECHNICAL FIELD

The present invention relates to a measurement control apparatus, a measurement system, a measurement control method, and a non-transitory computer readable medium storing a measurement control program.

BACKGROUND ART

A three-dimensional optical sensor that measures the distance from this three-dimensional optical sensor to a target object and the shape of the target object using light has been known. The three-dimensional optical sensor is used, for example, for inspection of infrastructure facilities and security monitoring since the three-dimensional optical sensor is able to acquire the distance from this three-dimensional optical sensor to target objects and the shapes of the target objects for a wide range by using, for example, a Time of Flight (ToF) method.

Patent Literature 1-3 are known, for example, as related art. Patent Literature 1 discloses a measurement apparatus that measures a dental cast by a laser displacement sensor, and, if there is a part of the dental cast that cannot be measured, it is measured by changing the inclination of the optical axis of the laser displacement sensor. Patent Literature 2 discloses an inspection apparatus using a laser, in which, based on the intensity of reflected light obtained by irradiating a target object with laser in a first scanning process, the intensity of irradiation light in a second scanning process is adjusted. Patent Literature 3 discloses a laser radar, in which data of measurement in a laser light reflector for determination installed in a monitored area is stored as initial data, and the state of the laser radar when it is installed and the spatial propagation state of the laser light are determined by comparing the results of the measurement in the light reflector with the initial data at the time of measurement.

CITATION LIST

Patent Literature

[Patent Literature 1] Japanese Unexamined Patent Application Publication No. H08-233519
[Patent Literature 2] Japanese Unexamined Patent Application Publication No. 2015-10959
[Patent Literature 3] Japanese Unexamined Patent Application Publication No. 2010-19621

SUMMARY OF INVENTION

Technical Problem

As described above, in the related art such as Patent Literature 1, even if the target object to be measured cannot be normally measured due to an inclination of the surface of the target object to be measured, the target object to be measured can be measured by changing the inclination of the optical axis of the laser. However, since the state of the measurement in the three-dimensional optical sensor is not taken into account in the related art, there is a problem that it is difficult to accurately make a measurement in a case where its state is one in which, for example, dirt is attached to the surface of the three-dimensional optical sensor.

The present disclosure has been made in view of the aforementioned problem, and aims to provide a measurement control apparatus, a measurement system, a measurement control method, and a non-transitory computer readable medium storing a measurement control program capable of dealing with various measurement states more accurately.

Solution to Problem

A measurement control apparatus according to the present disclosure includes: a detection unit configured to detect an abnormal part of point group data acquired from a three-dimensional optical sensor; a control unit configured to control the orientation of the three-dimensional optical sensor in accordance with the abnormal part that has been detected; and a determination unit configured to determine the case of the abnormality of the abnormal part based on the point group data measured by the three-dimensional optical sensor in the controlled orientation.

A measurement system according to the present disclosure includes a three-dimensional optical sensor and a measurement control apparatus, in which the measurement control apparatus includes: a detection unit configured to detect an abnormal part of point group data acquired from the three-dimensional optical sensor; a control unit configured to control the orientation of the three-dimensional optical sensor in accordance with the abnormal part that has been detected; and a determination unit configured to determine the case of the abnormality of the abnormal part based on the point group data measured by the three-dimensional optical sensor in the controlled orientation.

A measurement control method according to the present disclosure includes: detecting an abnormal part of point group data acquired from a three-dimensional optical sensor; controlling the orientation of the three-dimensional optical sensor in accordance with the abnormal part that has been detected; and determining the case of the abnormality of the abnormal part based on the point group data measured by the three-dimensional optical sensor in the controlled orientation.

A non-transitory computer readable medium storing a measurement control program according to the present disclosure is a non-transitory computer readable medium storing a measurement control program for causing a computer to execute processing of: detecting an abnormal part of point group data acquired from a three-dimensional optical sensor; controlling the orientation of the three-dimensional optical sensor in accordance with the abnormal part that has been detected; and determining the case of the abnormality of the abnormal part based on the point group data measured by the three-dimensional optical sensor in the controlled orientation.

Advantageous Effects of Invention

According to the present disclosure, it is possible to provide a measurement control apparatus, a measurement system, a measurement control method, and a non-transitory computer readable medium storing a measurement control program capable of dealing with various measurement states more accurately.

BRIEF DESCRIPTION OF DRAWINGS

FIG. 10 is a diagram showing an example of normal data measured by a three-dimensional optical sensor according to the first example embodiment;

FIG. 11 is a diagram showing an example of abnormal data measured by the three-dimensional optical sensor according to the first example embodiment;

DESCRIPTION OF EMBODIMENTS

Hereinafter, with reference to the drawings, example embodiments will be described. Throughout the drawings, the same elements are denoted by the same reference symbols and duplicated descriptions will be omitted as necessary.

(Considerations Leading to Example Embodiments)

As described above, the ToF method is, for example, used in a three-dimensional optical sensor. In the ToF method, the three-dimensional optical sensor emits a measurement light, receives light reflected from a target object to be measured, and measures the distance from the three-dimensional optical sensor to the target object to be measured based on the time from the irradiation of the measurement light to the reception of the reflected light and the light speed. While the ToF method will be given as an example of a method in which the three-dimensional optical sensor measures the distance in order to describe example embodiments of the present disclosure in the following description, this does not mean that the configuration of the present disclosure is limited thereto.

The three-dimensional optical sensor repeats scanning in a predetermined scanning direction and generates point group data (Point Cloud) including the distance or the like obtained in each measurement point by the ToF method. The point group data includes, besides the distance and positional information (x, y, z etc.) on the three-dimensional space, the value of the intensity (reflected luminance or luminance) of the reflected light of the irradiated light (hereinafter this light is also referred to as a beam).

Figure 1:
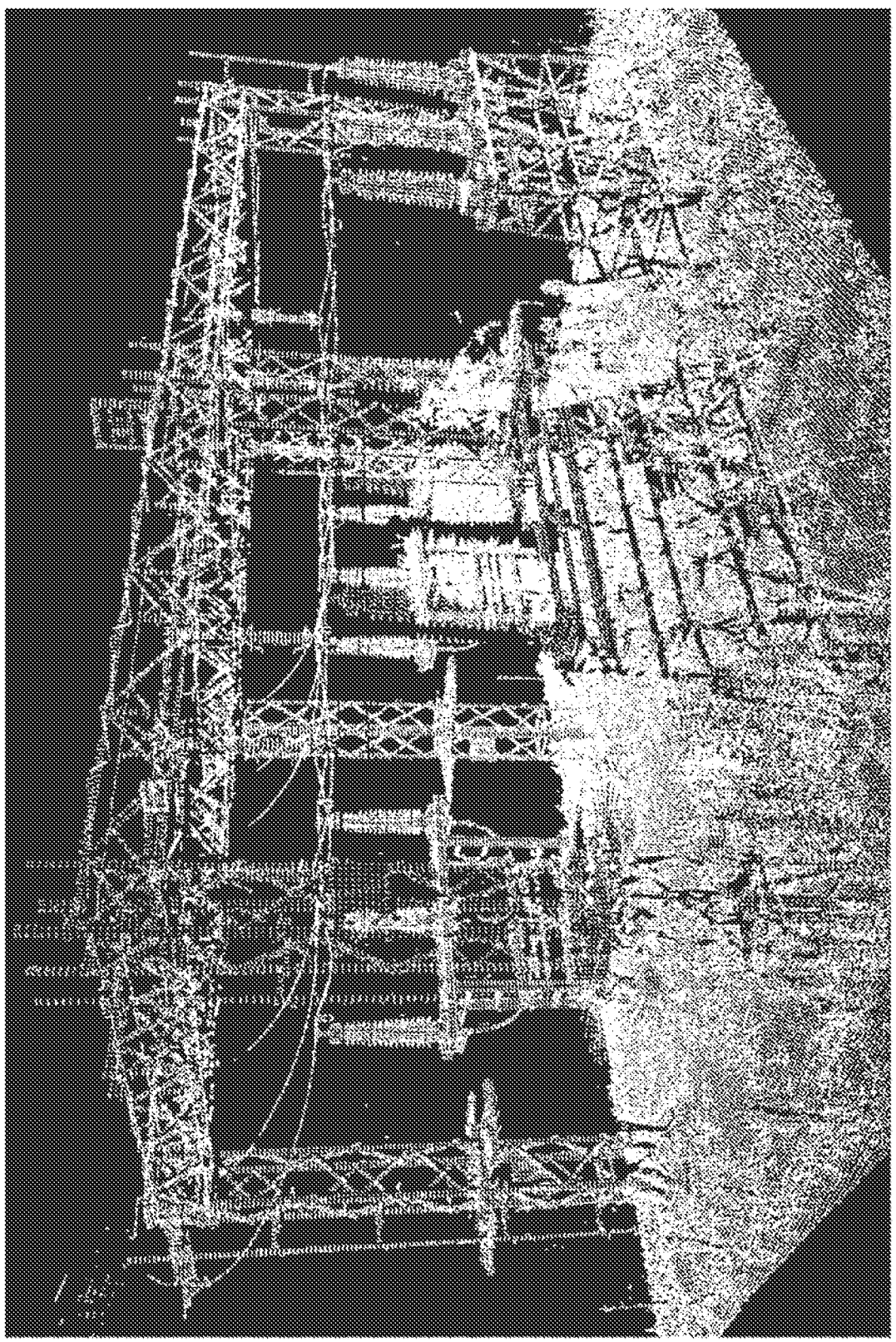
FIG. 1 is a diagram showing an example of point group data measured by a three-dimensional optical sensor.

FIG. 1 is an example of point group data obtained by measuring a power facility by a three-dimensional optical sensor. FIG. 1 shows the shape of the power facility based on the point group data. Further, it is possible to display the power facility by another color in accordance with the reflected luminance included in the point group data or display the power facility by another color in accordance with the distance included in the point group data. In this manner, it is possible to know the shape and the like of the target to be measured with a high accuracy by the point group data obtained from the three-dimensional optical sensor.

The present inventors have reviewed a method of performing inspection of a facility such as a power facility as shown in FIG. 1 using a three-dimensional optical sensor and found a problem that it is possible that normal measurement data may not be obtained depending on the measurement state of the three-dimensional optical sensor. That is, if the target to be measured is an outdoor power facility such as a substation, the three-dimensional optical sensor needs to be installed outdoors. If the three-dimensional optical sensor is installed outdoors, it is highly likely that dirt due to rainfall, snowfall, dust, animals or the like may be attached to the surface of the three-dimensional optical sensor. Therefore, due to dirt attached to the surface of the three-dimensional optical sensor, a failure occurs in the irradiation of beams and the detection of reflected light, whereby it becomes difficult to obtain the normal point group data.

Further, in the inspection of power facilities, it is desirable to save labor as much as possible. On the other hand, power facilities such as substations and steel towers exist in remote and mountainous areas in order to cover the entire country. Therefore, if it is necessary to go to maintenance every time the three-dimensional optical sensor fails, it is impossible to save labor.

In order to solve the aforementioned problem, it is necessary to accurately know the cause of the failure of the measurement by the three-dimensional optical sensor and take appropriate measures such as correcting the failure.

(Outline of Example Embodiments)

Figure 2:
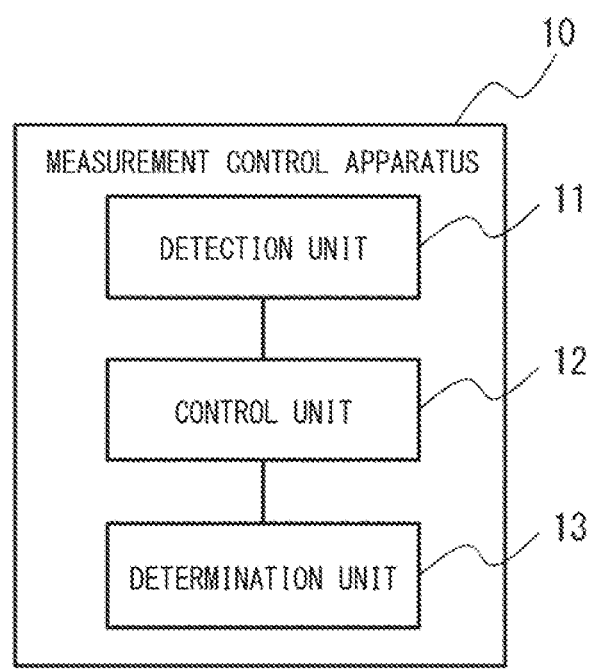
FIG. 2 is a configuration diagram showing an outline of a measurement control apparatus according to example embodiments.

FIG. 2 shows an outline of a measurement control apparatus according to the example embodiments. A measurement control apparatus 10 according to the example embodiments, which is an apparatus that controls measurement of a three-dimensional optical sensor, includes a detection unit 11, a control unit 12, and a determination unit 13, as shown in FIG. 2.

The detection unit 11 detects an abnormal part of point group data acquired from the three-dimensional optical sensor. The control unit 12 controls the orientation of the three-dimensional optical sensor in accordance with the abnormal part detected by the detection unit 11. The determination unit 13 determines the case of the abnormality of the abnormal part detected by the detection unit 11 based on the point group data measured by the three-dimensional optical sensor in the orientation controlled by the control unit 12. The measurement control apparatus 10 may further include a correction unit that corrects the point group data of the abnormal part using the point group data measured by the three-dimensional optical sensor in the orientation controlled by the control unit 12 based on the results of determining the case of the abnormality by the determination unit 13.

As described above, in the example embodiments, by detecting the abnormal part of the point group data, the direction of irradiation of the beam where it is likely that there is a failure in the irradiation or reflection of the beam can be known, and measurement is performed by controlling the orientation of the three-dimensional optical sensor in accordance with the direction, thereby determining the case of the abnormality. Accordingly, it is possible to know whether the cause of the abnormal part is in the three-dimensional optical sensor, whereby it is possible to appropriate perform correction and the like of the abnormal part and reduce the frequency of maintenance as much as possible.

First Example Embodiment

Figure 3:
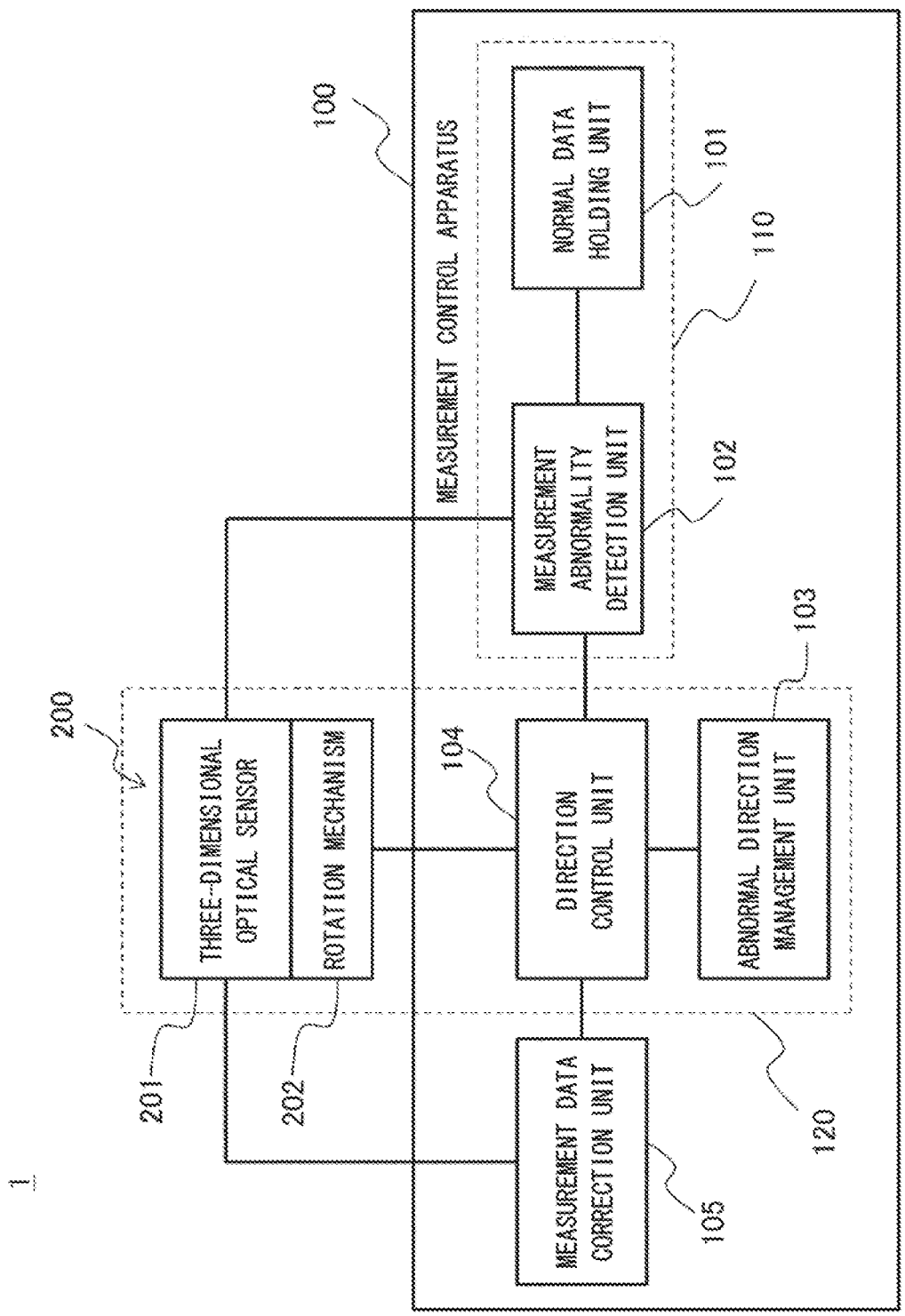
FIG. 3 is a configuration diagram showing a configuration example of a measurement system according to a first example embodiment.

Hereinafter, with reference to the drawings, a first example embodiment will be described. FIG. 3 shows a configuration example of a measurement system according to this example embodiment. As shown in FIG. 3, a measurement system 1 according to this example embodiment includes a measurement control apparatus 100 and a three-dimensional measurement apparatus 200.

The three-dimensional measurement apparatus 200 includes a three-dimensional optical sensor 201 and a rotation mechanism 202. The three-dimensional optical sensor 201 is a three-dimensional sensor that measures the distance from this three-dimensional optical sensor 201 to a target object by the ToF method and generates point group data (measurement data) based on the results of the measurement. The point group data includes, as described above, positional information, luminance information and the like of the three-dimensional space in each measurement point of the scan range (measurement range). Specifically, the three-dimensional optical sensor 201 is, for example, a 3D-Light Detection and Ranging (LiDAR).

Figure 4:
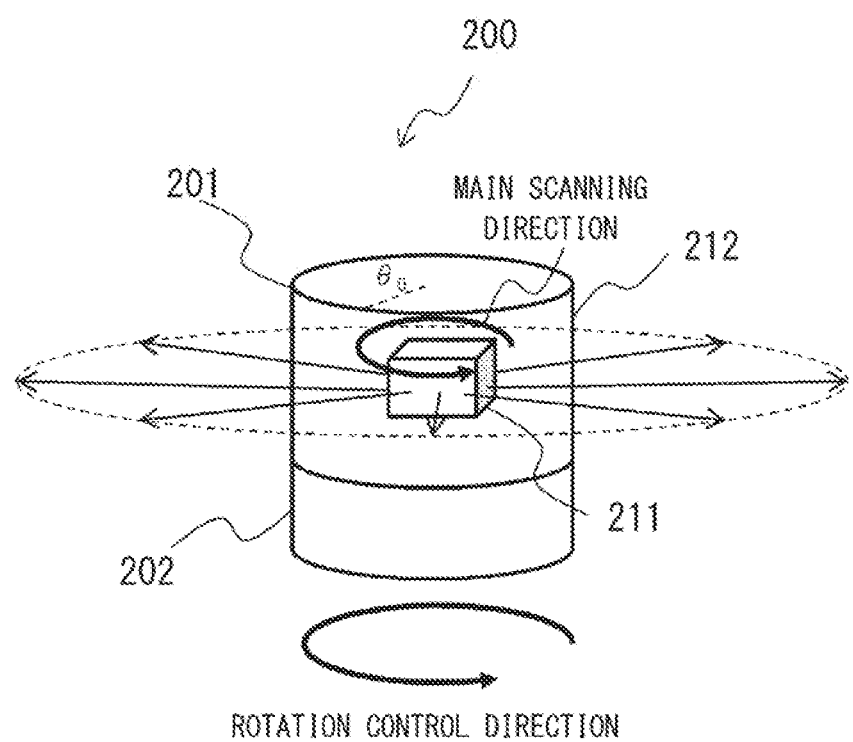
FIG. 4 is a schematic view showing a configuration example of a three-dimensional measurement apparatus according to the first example embodiment.

The three-dimensional optical sensor 201 is, for example, an omnidirectional sensor that scans beams in all directions. For example, the beams are scanned in the horizontal direction (main scanning direction) in a range of 360° and scanned in the vertical direction (sub scanning direction) perpendicular to the horizontal direction in a range of 180°, whereby target objects in all the directions near the three-dimensional optical sensor 201 are measured. As shown in FIG. 4, the three-dimensional optical sensor 201 includes a rotation optical system 211 therein and the entire three-dimensional optical sensor 201 is coated with a cover 212.

The rotation optical system 211, which is a scanning unit that scans light emitted from a light-emitting element, is, for example, a rotating mirror. The rotation optical system 211 rotates the beam in the main scanning direction, and moves the beam in the sub scanning direction in a state in which the cover 212 is being fixed. The light emitted from the rotation optical system 211 is irradiated onto the target object via the cover 212, and the light reflected from the target object is received via the cover 212. Rotary scanning may be performed in the main scanning direction while causing one beam to be moved in the sub scanning direction or rotary scanning may be performed in the main scanning direction by a plurality of beams aligned in the sub scanning direction.

The rotation mechanism 202 is an orientation changing mechanism that changes the orientation of the three-dimensional optical sensor 201. The change in the orientation of the three-dimensional optical sensor 201 is a change in the orientation of the entire three-dimensional optical sensor 201 including the cover 212. For example, when a desired irradiation direction of the main scanning range 0°-360° is denoted by $\theta_0$, the entire three-dimensional optical sensor 201 that faces $\theta_0$ is changed to a different direction.

The rotation mechanism 202 is, for example, a rotation stage. As shown in FIG. 4, the three-dimensional optical sensor 201 is fixed onto the rotation mechanism 202. The rotation mechanism 202 is driven to rotate in the rotation control direction in accordance with the control by the measurement control apparatus 100, and rotates the entire three-dimensional optical sensor 201. The rotation control direction, which is a direction that is not perpendicular to the surface of the three-dimensional optical sensor 201 drawn by the direction of irradiation of the beam (main scanning direction), is a direction that is parallel to the surface drawn by the irradiation direction. In this example, the main scanning direction of the beam of the three-dimensional optical sensor 201 is a horizontal direction, and the rotation control direction of the rotation mechanism 202 is also the horizontal direction.

As shown in FIG. 3, the measurement control apparatus 100 includes a normal data holding unit 101, a measurement abnormality detection unit 102, an abnormal direction management unit 103, a direction control unit 104, and a measurement data correction unit 105. The normal data holding unit 101 and the measurement abnormality detection unit 102 compose, for example, an abnormality determination unit that determines whether there is an abnormality in the measurement by the three-dimensional optical sensor 201. The three-dimensional optical sensor 201, the rotation mechanism 202, the direction control unit 104, and the measurement data correction unit 105 compose a measurement unit that performs a measurement by avoiding the direction of irradiation of the beam where the measurement abnormality has occurred.

The normal data holding unit 101 holds normal point group data (normal data) in advance. The normal data holding unit 101 holds point group data acquired by scanning the target object by the three-dimensional optical sensor 201 in the normal state.

The measurement abnormality detection unit (abnormality cause determination unit) 102 compares the normal point group data held in the normal data holding unit 101 with the point group data (measurement data) acquired by scanning the target object by the three-dimensional optical sensor 201 at the time of measurement or the like, and detects the abnormal part (abnormal direction) of the acquired point group data. The measurement abnormality detection unit 102 detects whether or not there is an abnormality in the measurement data or an abnormal level, and detects the direction of irradiation of the beam where the measurement abnormality has occurred. For example, the measurement abnormality detection unit 102 may detect whether or not there is an abnormality by determining whether or not there is a part where the point group data cannot be acquired (whether or not data is missing) or may detect the abnormal level (luminance change level) in accordance with the difference between the luminance of the normal data and the luminance of the measurement data. Further, the measurement abnormality detection unit 102 determines the cause of the abnormality that has been detected based on the results of performing the measurement again in the orientation changed in accordance with the detection of the abnormality.

Figure 5:
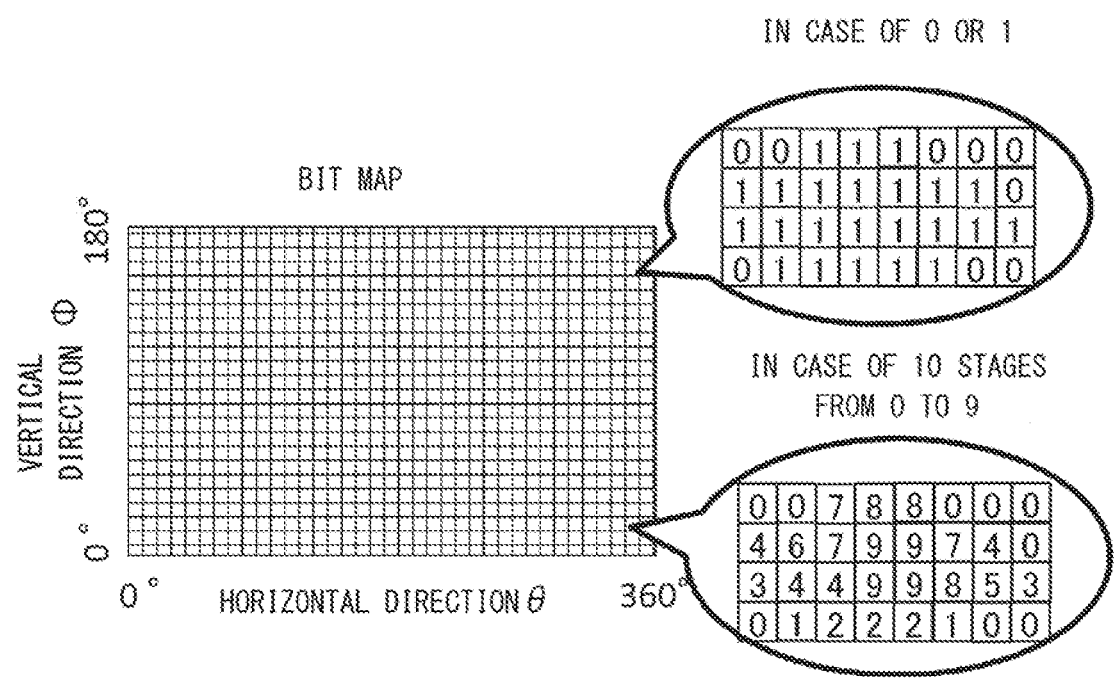
FIG. 5 is a diagram showing an example of a bit map used in a measurement control apparatus according to the first example embodiment.

The abnormal direction management unit 103 manages the direction of irradiation of the beam where there is a measurement abnormality based on the detection by the measurement abnormality detection unit 102. The abnormal direction management unit 103 manages whether or not there is an abnormality in the irradiation of the beam and detection for each direction of irradiation of the beam or for each of a plurality of irradiation directions nearby. The abnormal direction management unit 103 manages the results of detecting whether there is an abnormality in the irradiation direction (results of comparing the obtained data with the normal data) in the form of a bit map as shown in, for example, FIG. 5. The abnormal direction management unit 103 holds (manages) the bit map and the direction control unit 104 updates the bit map in accordance with the detection of the abnormality.

The bit map corresponds to the measurement range (scanning range) of the three-dimensional optical sensor 201. In this example, the bit map is data from 0° to 360° (0°≤θ<360°) in the horizontal direction (main scanning direction) and from 0° to 180° (0°≤Φ<180°) in the vertical direction (sub scanning direction), and each includes, for example, bit data in the units of 1°. For example, measurement abnormality may be managed for each bit data of horizontal direction 1°×vertical direction 1° or the measurement abnormality may be managed for each range including a plurality of pieces of bit data of horizontal direction N°×vertical direction N°.

The presence or the absence of an abnormality may be managed for each bit data or a plurality of stages of abnormal levels may be managed in accordance with the abnormality detection by the measurement abnormality detection unit 102. For example, the presence or the absence of an abnormality may be managed using binary data of 0 or 1 as each bit data, where 0 indicates that there is no abnormality and 1 indicates that there is an abnormality (not available). Further, the abnormal level may be managed using N-value data from 0 to N as each bit data, where 0 indicates that there is no abnormality and the level of abnormality is indicated by N stages between 1 and N. When the abnormal level is managed, the degree of decrease in the luminance as compared to the normal state may be expressed by N stages. Further, when the abnormal level is managed for each range including a plurality of pieces of bit data (a plurality of irradiation directions), the number of pieces of data acquired in the above range may be expressed by N stages. Further, the abnormal level may be set in accordance with the change in the number of pieces of data that have been acquired in the above range.

The direction control unit 104 changes the direction of the three-dimensional optical sensor 201 when the direction of irradiation of the beam where there is a measurement abnormality is measured based on the information managed by the abnormal direction management unit 103. The direction control unit 104 refers to the bit map of the abnormal direction management unit 103, and controls the rotary drive of the rotation mechanism 202 so that the three-dimensional optical sensor 201 faces the normal direction where an abnormality is not detected to change the orientation of the three-dimensional optical sensor 201. The direction control unit 104 manages an amount of change (angle) where the direction in which there is a measurement abnormality has been changed.

The measurement data correction unit 105 corrects the point group data (measurement data) obtained by the three-dimensional optical sensor 201 whose direction has been changed based on the direction changed by the direction control unit 104. The measurement data correction unit 105 corrects the point group data in accordance with the amount of change in the orientation of the three-dimensional optical sensor 201 by the direction control unit 104. Further, the measurement data correction unit 105 may correct the point group data in accordance with the abnormal level when the abnormal direction management unit 103 manages the abnormal level by N stages. For example, a table or the like for obtaining the rate of decrease in luminance may be held for each abnormal level, and the luminance value of the point group data is corrected in accordance with the abnormal level. While an amount of decrease in accordance with the abnormal level may be obtained in place of the rate of decrease in accordance with the abnormal level, if the amount of decrease is to be obtained, it is preferable to know the orientation of the target object since the luminance value changes depending on the orientation of the target object.

Figure 6:
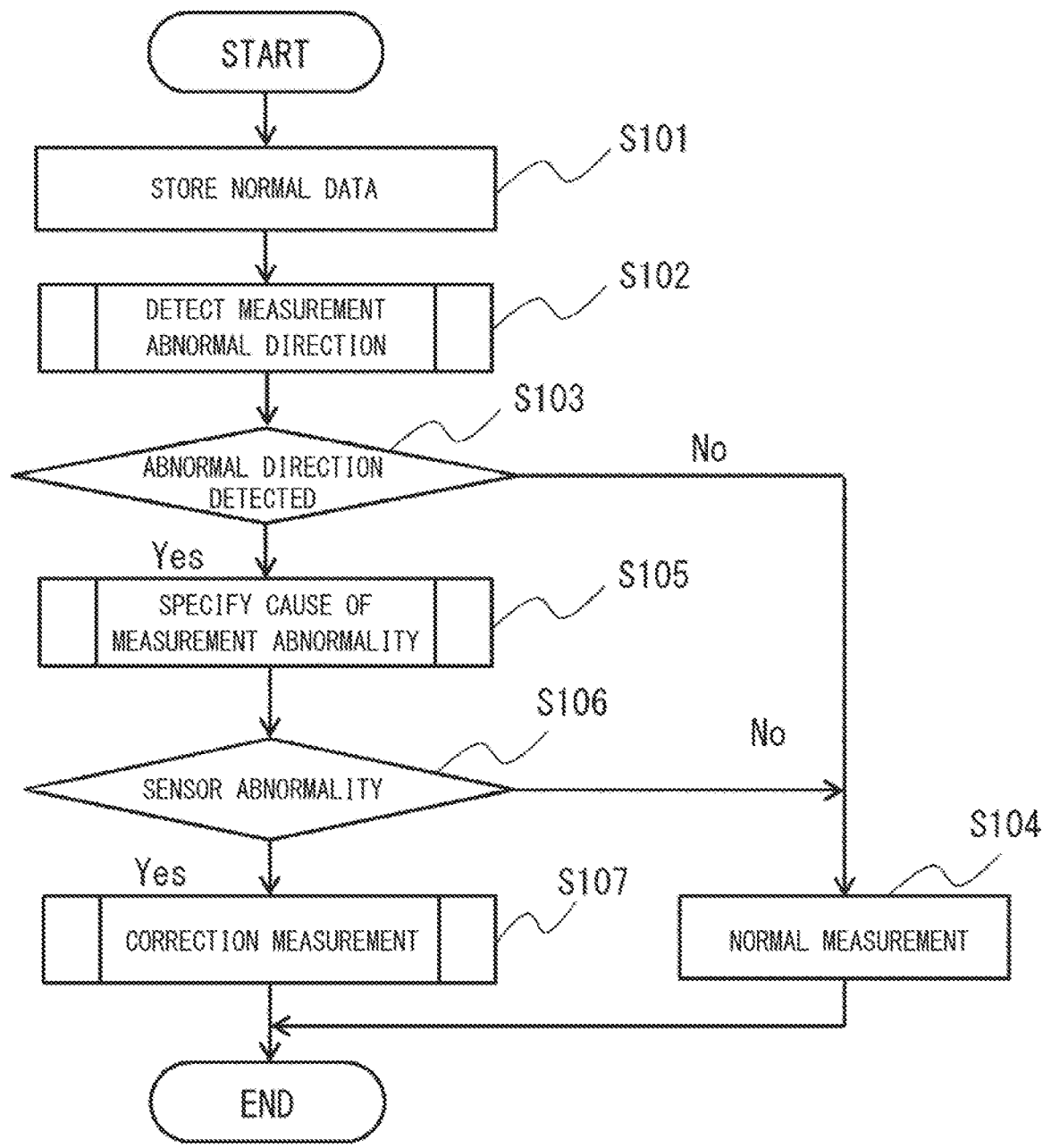
FIG. 6 is a flowchart showing an operation example of the measurement system according to the first example embodiment.
Figure 7:
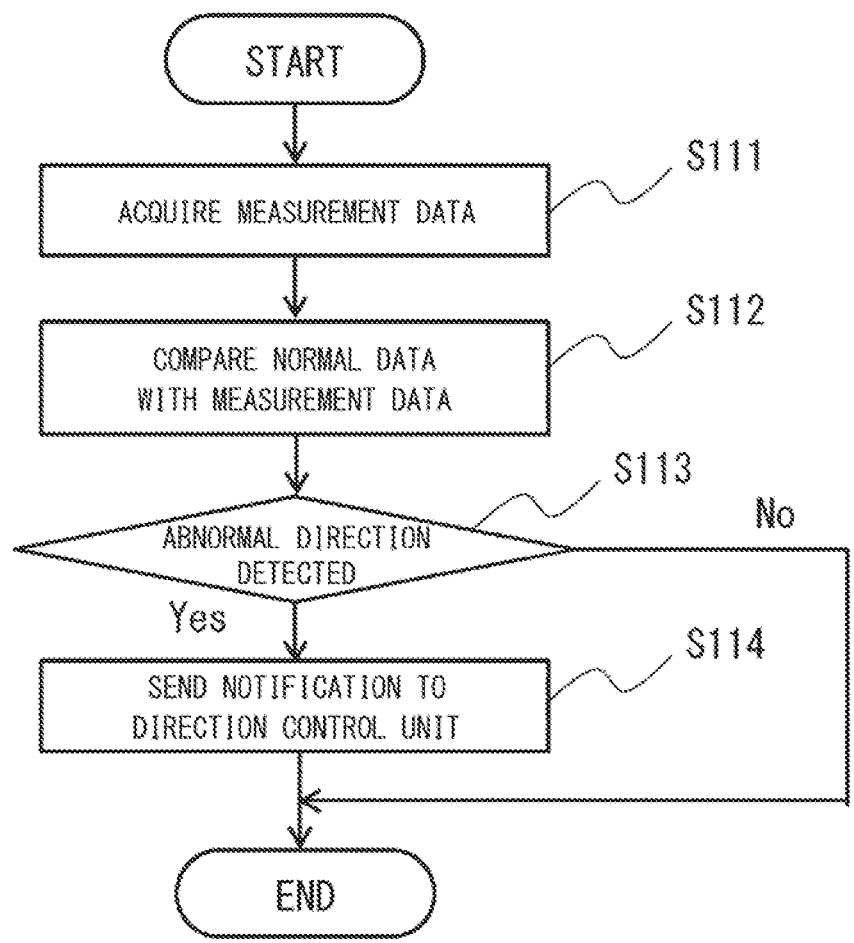
FIG. 7 is a flowchart showing an operation example of measurement abnormal direction detection processing according to the first example embodiment.
Figure 8:
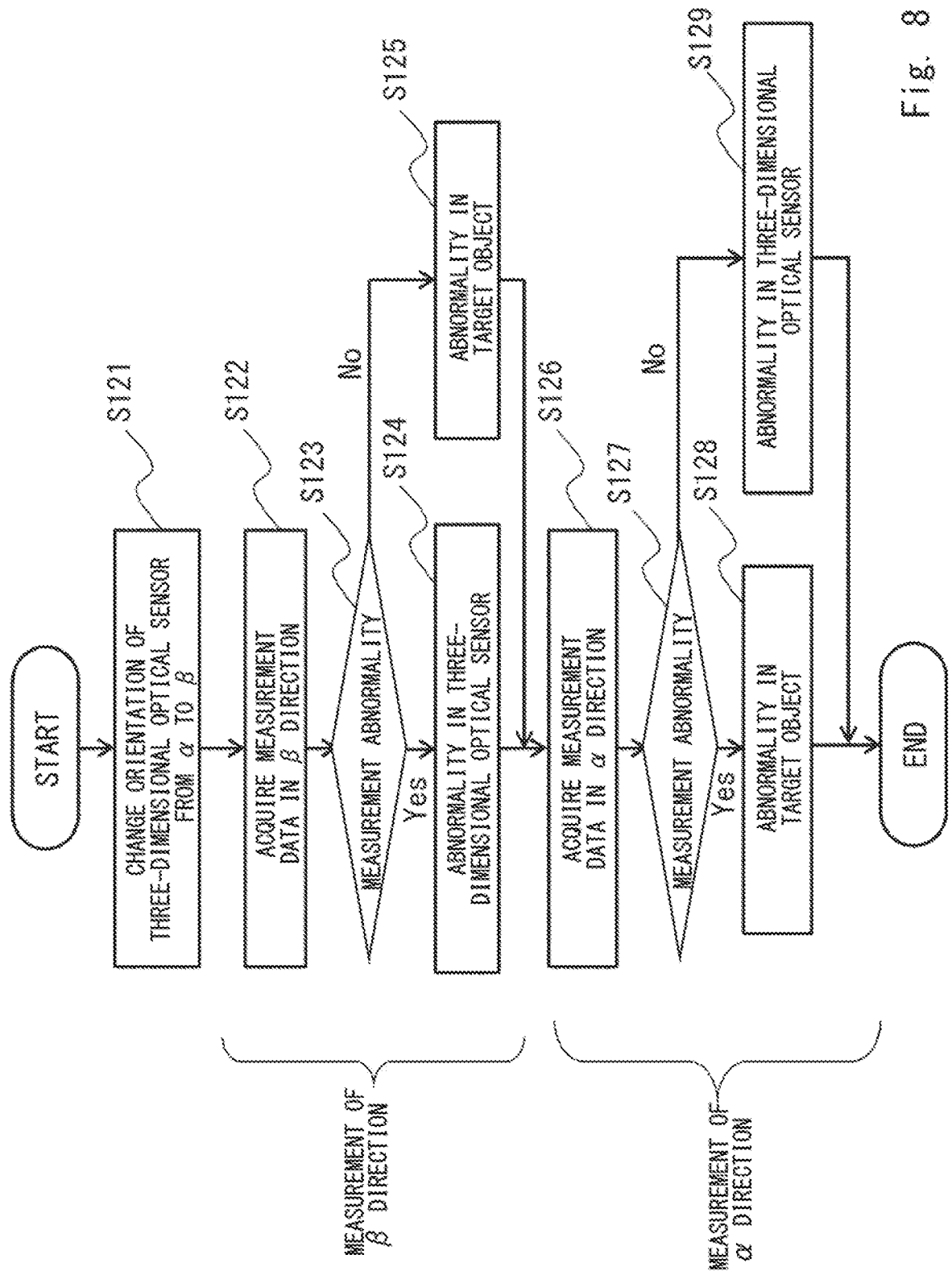
FIG. 8 is a flowchart showing an operation example of measurement abnormality cause specifying processing according to the first example embodiment.
Figure 9:
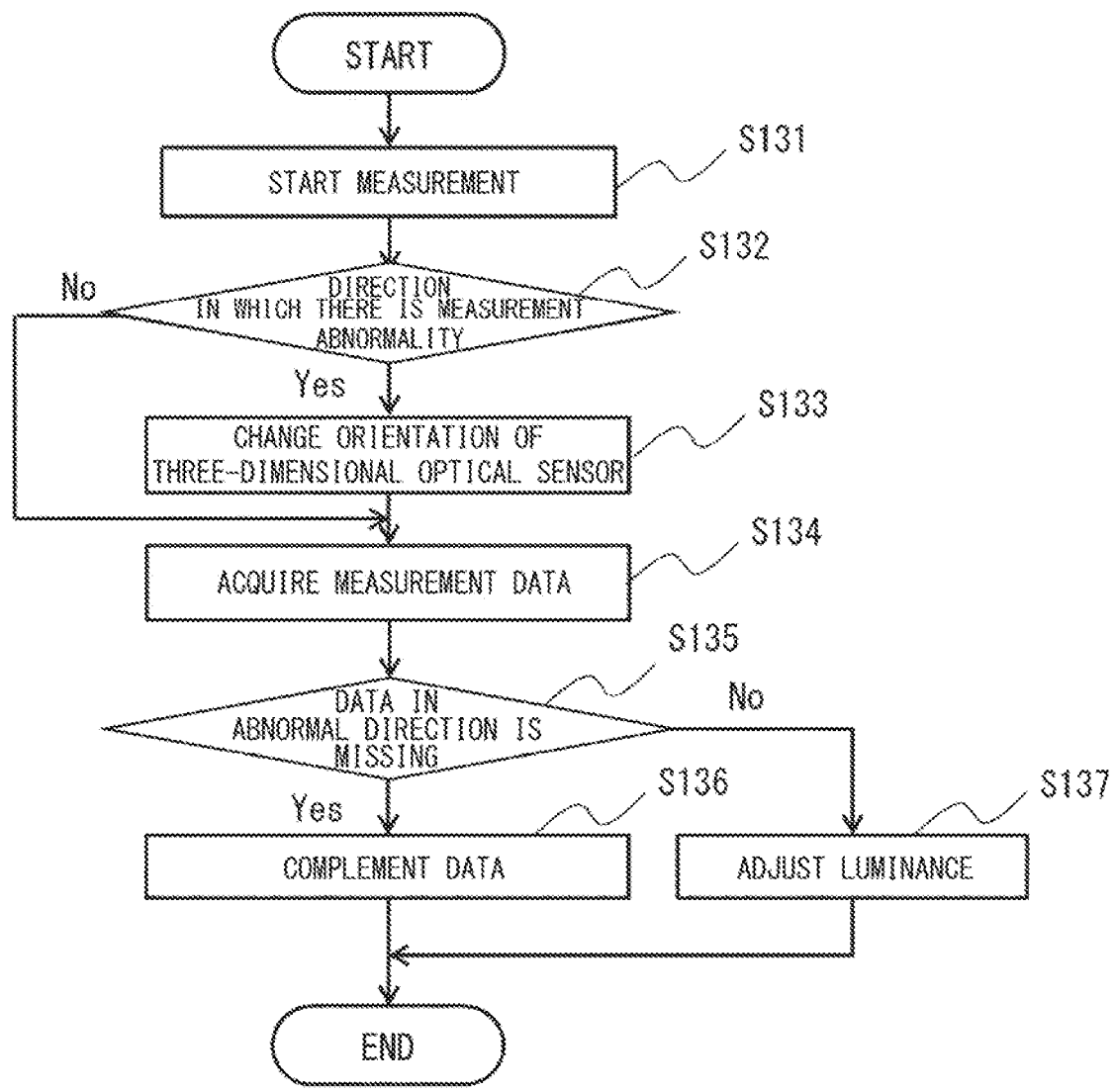
FIG. 9 is a flowchart showing an operation example of correction measurement processing according to the first example embodiment.

Next, an operation of the measurement system 1 according to this example embodiment will be described. FIG. 6 shows a flow of an overall operation of the measurement system 1. FIG. 7 shows a flow of measurement abnormal direction detection processing (S102) in FIG. 6, FIG. 8 shows a flow of measurement abnormality cause specifying processing (S105) in FIG. 6, and FIG. 9 shows a flow of correction measurement processing (S107) in FIG. 6.

As shown in FIG. 6, first, the measurement control apparatus 100 stores normal data (S101). For example, as shown in FIG. 10, the measurement control apparatus 100 scans the target object in a state in which there is no dirt in the three-dimensional optical sensor 201, thereby generating normal point group data (normal data). The normal data holding unit 101 holds the normal data generated by the three-dimensional optical sensor 201. As shown in FIG. 10, the normal data includes positional information and luminance information in accordance with the target object at each measurement point of the measurement range (scan range) of the three-dimensional optical sensor 201. As long as the three-dimensional optical sensor 201 normally receives the reflected light from the target object, there is no data missing (data is not missing).

Next, the measurement control apparatus 100 detects the measurement abnormal direction (S102). The detection of the measurement abnormal direction may be performed at any timing after the normal data is stored. For example, the detection may be periodically performed at a timing different from that when the target object is measured for inspection or the like, or the detection may be constantly performed at the same timing as that when the measurement is performed.

In the measurement abnormal direction detection processing (S102), as shown in FIG. 7, the measurement abnormality detection unit 102 acquires the measurement data (S111). The three-dimensional optical sensor 201 scans the target object to generate point group data (measurement data), like in the acquisition of normal data. The measurement abnormality detection unit 102 acquires the measurement data generated by the three-dimensional optical sensor 201 in order to detect measurement abnormality.

Next, the measurement abnormality detection unit 102 compares the normal data with the measurement data (S112) and determines whether or not there is an abnormal direction (S113). After the measurement abnormality detection unit 102 acquires the measurement data from the three-dimensional optical sensor 201, the measurement abnormality detection unit 102 compares the normal data held in the normal data holding unit 101 with the measurement data acquired from the three-dimensional optical sensor 201.

If, for example, the target object is scanned in a state in which dirt is attached to the surface (cover 212) of the three-dimensional optical sensor 201 as shown in FIG. 11, an abnormality occurs in a part of the point group data that corresponds to the dirt since it is impossible to normally irradiate beams or receive light in the direction in which dirt is attached. The abnormal part (abnormal direction) of the point group data is detected by comparing it with the normal data. In the example shown in FIG. 11, the measurement abnormality detection unit 102 determines that there is an abnormality since there is an area where data is missing (no data) compared to the normal data. Alternatively, the measurement abnormality detection unit 102 determines that there is an abnormality when there is an area where there is a difference in luminance compared to the normal data.

Further, it may be determined whether there is an abnormality by comparing measurement data obtained by a single measurement with the normal data or by comparing measurement data obtained by a plurality of measurements with the normal data. If, for example, a flying object such as a bird or an insect flies or a vehicle or a person passes between the three-dimensional optical sensor 201 and the target object, an abnormality may temporarily occur in the measurement data. By determining whether or not there is an abnormality using the measurement data obtained by a plurality of measurements, false detection due to a temporary abnormality can be prevented. For example, after the measurement is performed once, the measurement may be performed a plurality of times at predetermined intervals. When it is detected whether there is an abnormality, it may be determined whether there is an abnormality based on the number of times that the abnormality has occurred as a result of the plurality of measurements. On the other hand, when the abnormal level is to be detected, the abnormality may be determined based on the average value of the abnormal levels.

When it is determined in S113 that there is an abnormal direction in the measurement data, the measurement abnormality detection unit 102 notifies the direction control unit 104 of results of detecting an abnormality (S114). The direction control unit 104 sets the presence or the absence of an abnormality of the abnormal direction regarding which it is desired that a notification be obtained or the abnormal level in the bit map of the abnormal direction management unit 103.

Next, as shown in FIG. 6, when an abnormal direction is not detected in the measurement abnormal direction detection processing (S103/No), normal measurement is performed by the three-dimensional optical sensor 201 since correction control by the measurement control apparatus 100 is not necessary (S104). That is, the three-dimensional optical sensor 201 generates point group data by scanning the target object, repeats measurement abnormal direction detection processing (S102) and the following processing as necessary, and performs normal measurement until an abnormality is detected.

On the other hand, when an abnormal direction has been detected in the measurement abnormal direction detection processing (S103/Yes), the measurement control apparatus 100 specifies the cause of the measurement abnormality (S105). That is, the measurement abnormality detection unit 102 requests the direction control unit 104 to change the orientation of the three-dimensional optical sensor 201 regarding the direction of irradiation of the beam where it is estimated that an abnormality has occurred, performs measurement again in the orientation after the change once or more times, and determines whether the cause of the abnormality is in the three-dimensional optical sensor 201 or in the target object based on the results of the measurement.

Figure 12:
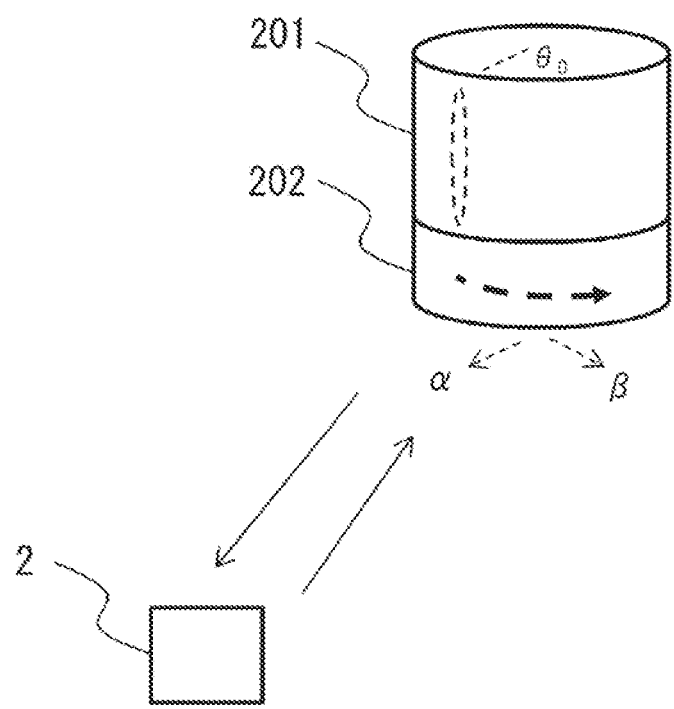
FIG. 12 is a diagram for describing a measurement abnormality cause specifying method according to the first example embodiment.

Specifically, in the measurement abnormality cause specifying processing (S105), as shown in FIG. 8, the orientation of the three-dimensional optical sensor 201 is changed, for example, from α to β (S121). In this example, an explanation will be given assuming that the direction before the change is α and the direction after the change is β. As shown in FIG. 12, when there is an abnormality in the measurement data as a result of measurement by the three-dimensional optical sensor 201 irradiating a beam onto the target object 2 in the α direction, the orientation of the three-dimensional optical sensor 201 is rotated to the β direction in which there is no abnormality in the measurement data.

Next, in the state in which the orientation of the three-dimensional optical sensor 201 is changed, the β direction after the change and the α direction before the change are measured. Either one of the measurement of the β direction or the measurement of the α direction may be performed first. Further, the measurement of the β direction and the measurement of the α direction may be both performed or only one of them may be performed.

In the measurement of the β direction (S122-S125), the measurement abnormality detection unit 102 acquires the measurement data in the β direction (S122). The three-dimensional optical sensor 201 performs measurement by irradiating a beam in the direction that corresponds to the abnormality detection part after the change in the state in which the orientation has been changed, and the measurement abnormality detection unit 102 acquires the measurement data. When, for example, the abnormality in the α direction is detected and the orientation of the three-dimensional optical sensor 201 has been changed from the a direction to the β direction, like in FIG. 13, the target object 3 is measured in the β direction that corresponds to the abnormality detection part after the change.

Next, the measurement abnormality detection unit 102 determines whether or not there is a measurement abnormality in the measurement data of the β direction that has been acquired (S123). When there is an abnormality in the results of measuring the β direction, the measurement abnormality detection unit 102 determines that there is an abnormality in the three-dimensional optical sensor (S124). On the other hand, when there is no abnormality in the results of measuring the β direction (the results are normal), the measurement abnormality detection unit 102 determines that there is an abnormality in the target object (S125).

Figure 13:
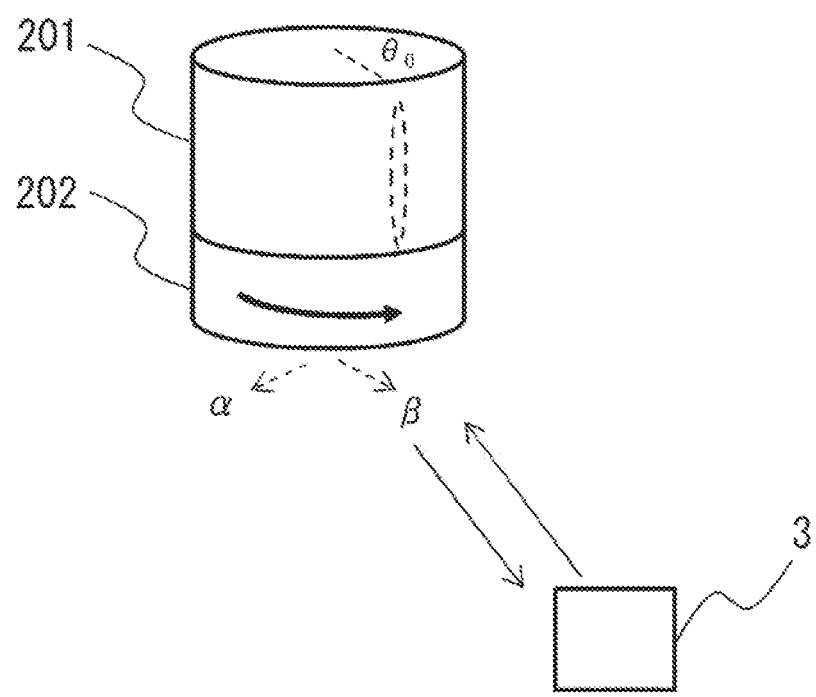
FIG. 13 is a diagram for describing the measurement abnormality cause specifying method according to the first example embodiment.

That is, when the abnormality has been detected in the α direction before the direction is changed in FIG. 12 and the abnormality has also been detected in the β direction after the direction is changed in FIG. 13, it is determined that there is an abnormality such as dirt in the three-dimensional optical sensor since the measurement abnormality is detected even after the target object has been changed. Further, when an abnormality has been detected in the α direction before the direction is changed in FIG. 12 and an abnormality has not been detected in the β direction after the direction is changed in FIG. 13, it is determined that there is an abnormality such as dirt in the target object, not in the three-dimensional optical sensor, since the abnormal state has recovered to the normal state due to the change in the target object. When it is determined that there is an abnormality in the target object, the normal data in the normal data holding unit 101 is corrected.

Further, when the α direction is measured (S126-S129), the measurement abnormality detection unit 102 acquires the measurement data of the α direction (S126). The three-dimensional optical sensor 201 performs a measurement by irradiating a beam in the direction that corresponds to the abnormality detection part before the orientation is changed in a state in which the orientation has been changed, and the measurement abnormality detection unit 102 acquires measurement data thereof. When, for example, the abnormality in the a direction is detected and the orientation of the three-dimensional optical sensor 201 has been changed from the α direction to the β direction, as shown in FIG. 14, the target object 2 is measured again in the α direction that corresponds to the abnormality detection part before the orientation is changed.

Next, the measurement abnormality detection unit 102 determines whether or not there is a measurement abnormality in the measurement data in the α direction that has been acquired (S127). When there is an abnormality in the results of measuring the α direction, the measurement abnormality detection unit 102 determines that there is an abnormality in the target object (S128). On the other hand, when there is no abnormality in the results of measuring the α direction (the results are normal), the measurement abnormality detection unit 102 determines that there is an abnormality in the three-dimensional optical sensor 201 (S129).

Figure 14:
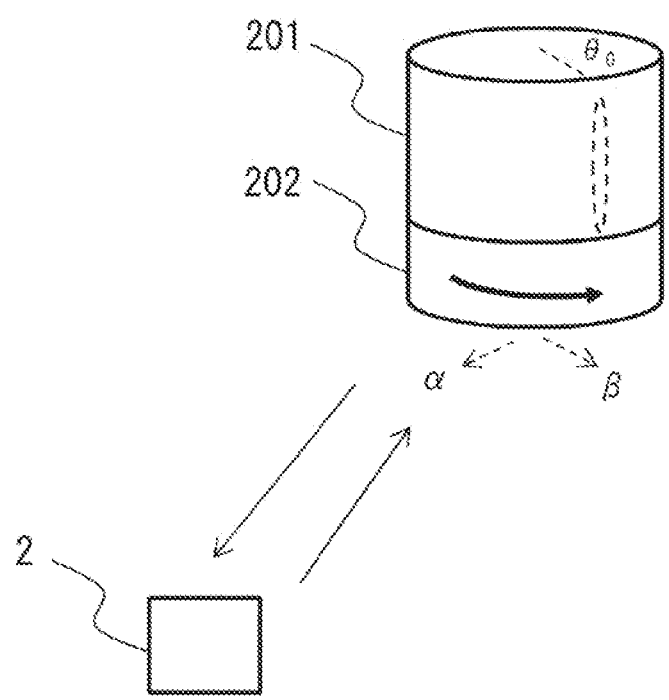
FIG. 14 is a diagram for describing the measurement abnormality cause specifying method according to the first example embodiment.

That is, when the abnormality has been detected in the α direction before the direction is changed in FIG. 12 and the abnormality has been detected in the same α direction after the direction is changed in FIG. 14, it is determined that there is an abnormality such as dirt in the target object, not in the three-dimensional optical sensor since the measurement abnormality has been detected even after the orientation of the three-dimensional optical sensor 201 is changed. Further, when an abnormality has been detected in the α direction before the direction is changed in FIG. 12 and further an abnormality is not detected in the same α direction after the direction is changed in FIG. 14, it is determined that there is an abnormality such as dirt in the three-dimensional optical sensor since the abnormal state has recovered to the normal state due to the change in the orientation of the three-dimensional optical sensor 201. When it is determined that there is an abnormality in the target object, the normal data in the normal data holding unit 101 is corrected.

Next, when it is determined that there is no abnormality in the sensor (there is an abnormality in the target object) in the measurement abnormality cause specifying processing, as shown in FIG. 6 (S106/No), normal measurement is performed by the three-dimensional optical sensor 201 since correction control by the measurement control apparatus 100 is not necessary (S104).

On the other hand, when it is determined in the measurement abnormality cause specifying processing that there is an abnormality in the sensor (S106/Yes), the measurement control apparatus 100 performs correction measurement processing (S107) for correcting data in the abnormal direction.

In the correction measurement processing (S107), as shown in FIG. 9, the three-dimensional optical sensor 201 starts measuring the target object (S131). When the three-dimensional optical sensor 201 starts scanning, the direction control unit 104 determines whether or not the direction of irradiation of the beam that is being measured is a direction in which there is a measurement abnormality (S132).

When the direction of irradiation of the beam is the direction in which there is a measurement abnormality, the direction control unit 104 changes the orientation of the three-dimensional optical sensor 201 (S133). The direction control unit 104 refers to the bit map of the abnormal direction management unit 103, selects the normal direction in which an abnormality is not detected, and changes the orientation of the three-dimensional optical sensor 201 to the selected direction. When the presence or the absence of an abnormality is managed, the direction in which there is no abnormality is selected. Further, when the abnormal level is managed, the direction whose abnormal level is 0 or whose value is lower than a threshold is selected. At this time, the direction is preferably changed to one of normal directions in which the amount of change in the orientation from the abnormal direction is small or the orientation in which the directions which do not include abnormalities are continuous (the direction in which 0 is consecutive in the bit map). For example, the direction may be changed to the orientation that is the closest to the abnormal direction for a single beam irradiation or may be changed to the direction in which the amount of change in the orientation becomes minimum including M times of beam irradiation.

Next, the measurement data correction unit 105 acquires the measurement data (S134). The three-dimensional optical sensor 201 irradiates a beam in the orientation after the change for the direction in which there is an abnormality and irradiates a beam in the orientation before the change for the direction in which there is no abnormality, thereby generating point group data (measurement data) by scanning the target object. The measurement data correction unit 105 acquires the measurement data generated by the three-dimensional optical sensor 201 in order to correct data in the abnormal direction.

Next, the measurement data correction unit 105 determines whether or not the data in the abnormal direction is missing (S135). When data in the abnormal direction is missing, the measurement data correction unit 105 complements data (S136). When data in the abnormal direction is present, the measurement data correction unit 105 adjusts the luminance of the data (S137). The measurement data correction unit 105 rotates (changes) the position of the three-dimensional coordinates of the data acquired in the orientation after the change in accordance with the angle of the orientation changed by the direction control unit 104, and corrects the data of the orientation before the change. At this time, if data in the abnormal direction is missing (data is missing), the data in the abnormal direction is complemented (data is buried) using the data acquired in the orientation after the change. If there is data in the abnormal direction (there is data whose luminance is low), the luminance of the data in the abnormal direction is adjusted to the normal value using the luminance of the data acquired in the orientation after the change. Note that the data in the direction in which the orientation is not changed is not corrected (correction value: zero).

As described above, in this example embodiment, the rotation mechanism that rotates the orientation of the three-dimensional optical sensor such as 3D-LiDAR is included. Then, when an abnormality has been detected in measurement data of the three-dimensional optical sensor, the orientation of the three-dimensional optical sensor is changed in accordance with the direction of the abnormality that has been detected, whereby normal measurement data can be obtained. Further, when an abnormality has been detected, the orientation of the three-dimensional optical sensor is changed and the measurement is made again to determine whether or not the cause of the measurement abnormality is in the three-dimensional optical sensor, whereby it is possible to reliably correct the measurement data. When, for example, outdoor maintenance inspection is performed at a remote place, it is possible to appropriately know whether or not the maintenance is necessary after checking the cause of the measurement abnormality.

Second Example Embodiment

Hereinafter, with reference to the drawings, a second example embodiment will be described. In this example embodiment, an example of performing control further using external environment information in the configuration of the first example embodiment will be described.

Figure 15:
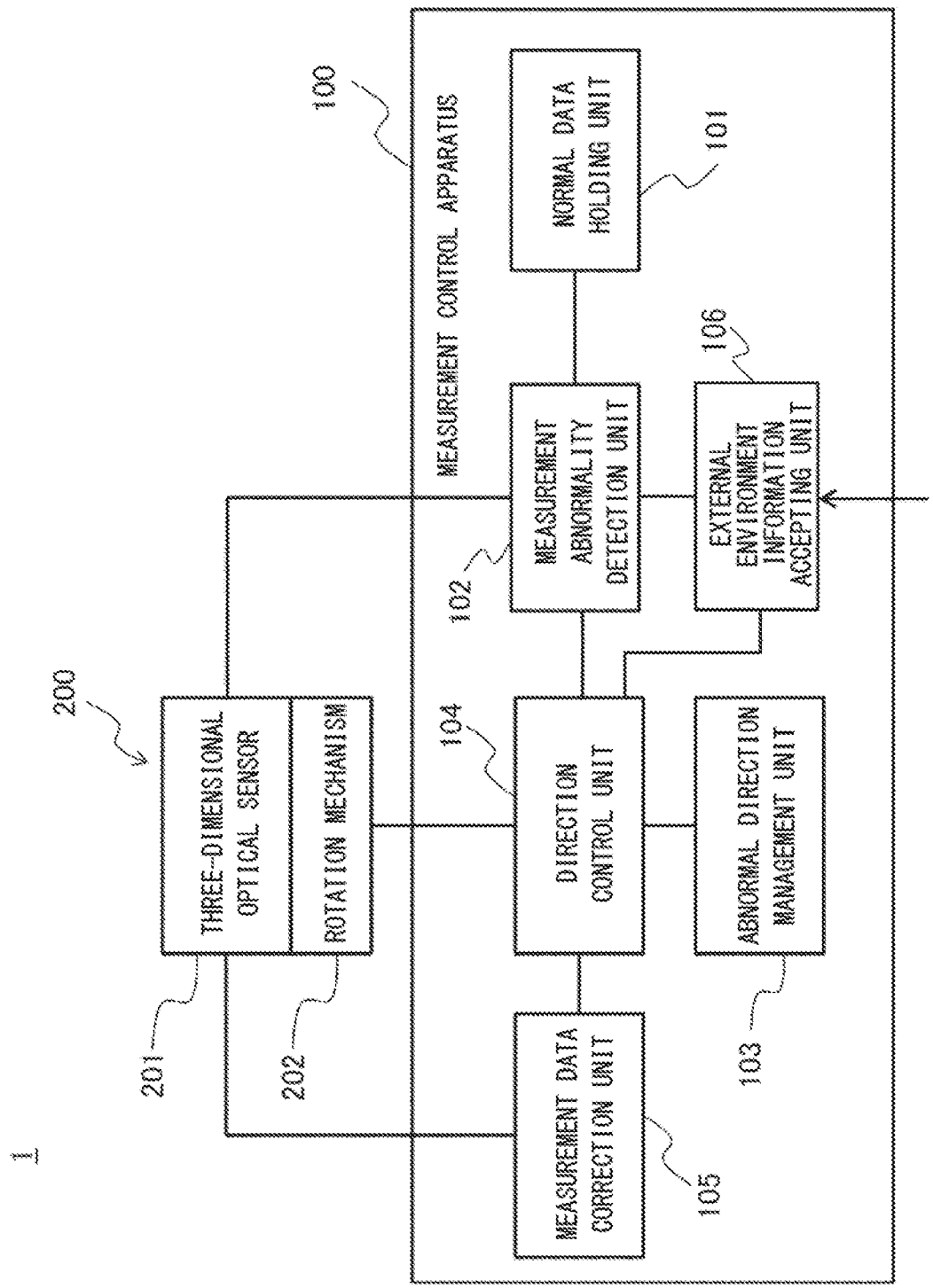
FIG. 15 is a configuration diagram showing a configuration example of a measurement system according to a second example embodiment.

FIG. 15 shows a configuration example of a measurement system according to this example embodiment. As shown in FIG. 15, this example embodiment is different from the first example embodiment in that an external environment information accepting unit 106 is further included in a measurement control apparatus 100 in this example embodiment. The external environment information accepting unit 106, which is connected, for example, to an external network, externally accepts information on the external environment such as weather. The information on the external environment, which is information indicating the state of the external environment that may affect measurement by the three-dimensional optical sensor 201, is, for example, weather information, information on maintenance or renovation of equipment of a target facility. The weather information may be acquired, for example, from the internet and the facility information may be acquired, for example, from a database or the like that manages the facility information.

When the surface of a target object gets wet due to rain or other causes, a layer of water or oil is formed on this surface, which causes light to be totally reflected, which may prevent the reflected light from being normally received in the three-dimensional optical sensor 201. Further, since power facilities and the like are regularly renovated, it is possible that the state and the shape of the target object may change. Therefore, information on the external environment including these information items is used to detect a measurement abnormality and control the direction. That is, the external environment information accepting unit 106 acquires the information on the external environment and notifies the measurement abnormality detection unit 102 and the direction control unit 104 that the external environment has been changed.

The measurement abnormality detection unit 102 changes the conditions under which the measurement abnormality is detected based on the information on the external environment sent from the external environment information accepting unit 106 and detects the measurement abnormality under the conditions that have been changed. When, for example, the information on the external environment is information on the change in the target object to be measured such as maintenance or renovation of equipment, the part of normal data of the target object to be measured held by the normal data holding unit 101 that has been changed is updated. The direction which affects the change is known from the information on the change in the target object to be measured and normal data that corresponds to this direction is updated. The normal data may be updated by information indicating the change in the target object or by measuring, by the three-dimensional optical sensor 201, the target object after the change.

The direction control unit 104 changes management information on the abnormal direction based on the information on the external environment sent from the external environment information accepting unit 106, and controls the orientation of the three-dimensional optical sensor 201 using the information that has been changed. When, for example, the information on the external environment is weather information, data managed by the abnormal direction management unit 103 is updated since weather may affect the surface of the three-dimensional optical sensor 201. When, for example, the weather changes from rain to fine weather, the rain washes away the dirt, resulting in some areas being clean and others being dirty. Therefore, the part of the bit map of the abnormal direction management unit 103 that corresponds to the target object is updated. Further, when the information on the external environment is information on the change in the target object to be measured such as maintenance or renovation of equipment, after the normal data in the normal data holding unit 101 is updated, the data managed by the abnormal direction management unit 103 is updated based on the normal data.

As described above, by acquiring information regarding the external environment such as weather or the target facility, false detection or erroneous control, which is due to an influence of the change in the external environment, can be prevented, whereby it is possible to appropriately perform abnormality detection and direction control.

Third Example Embodiment

Hereinafter, with reference to the drawings, a third example embodiment will be described. In this example embodiment, an example in which a notification is further sent externally in the configuration of the first example embodiment will be described. Note that this example embodiment may be applied to the second example embodiment.

Figure 16:
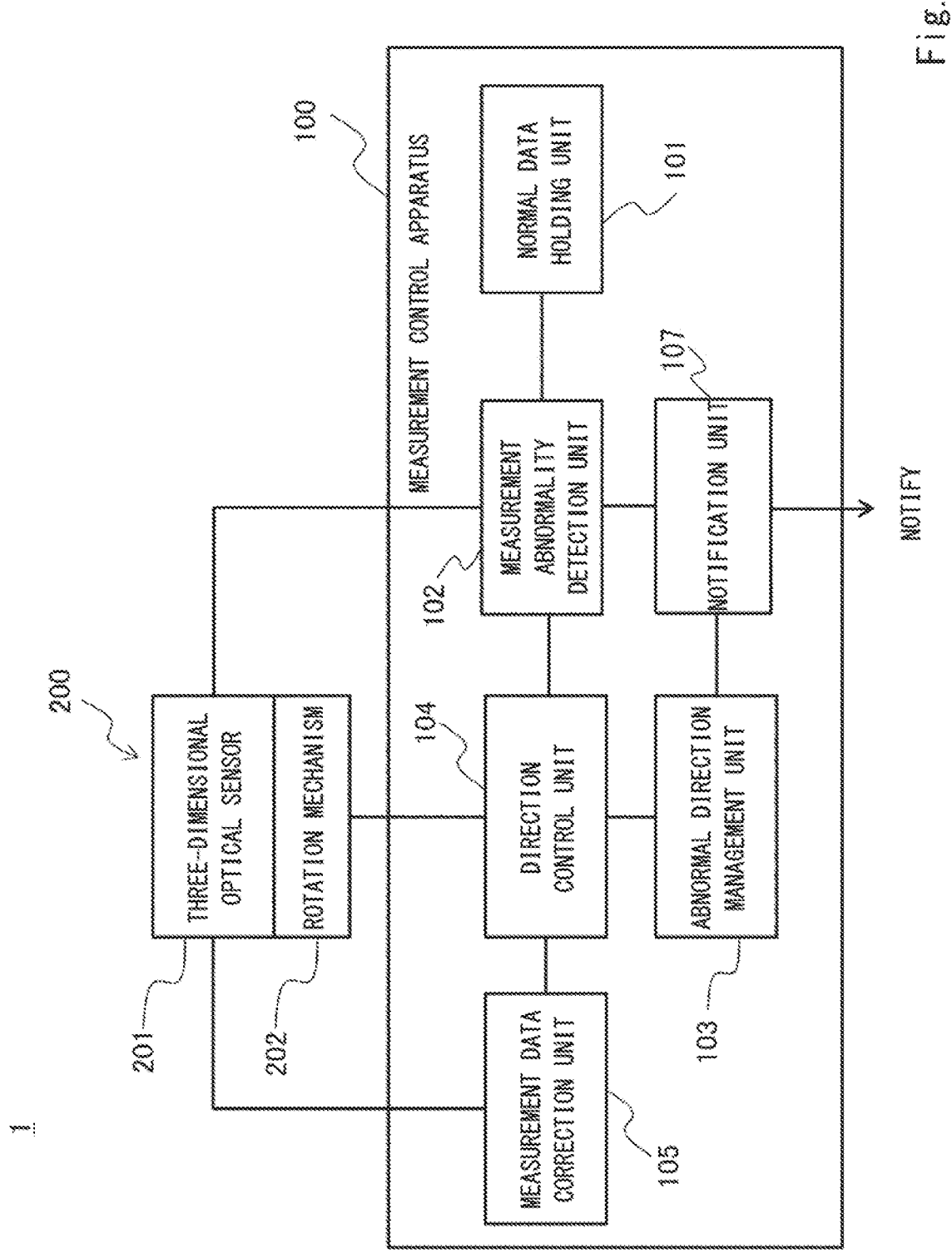
FIG. 16 is a configuration diagram showing a configuration example of a measurement system according to a third example embodiment.

FIG. 16 shows a configuration example of a measurement system according to this example embodiment. As shown in FIG. 16, a measurement control apparatus 100 according to this example embodiment is different from that in the first example embodiment in that the measurement control apparatus 100 according to this example embodiment further includes a notification unit 107. The notification unit 107, which is connected to an external network or the like, notifies a remote operator of results of detection by the measurement abnormality detection unit 102 regarding whether there is an abnormality or the cause of the abnormality, data managed by the abnormal direction management unit 103 or the like via a network. When, for example, the abnormality of the irradiation direction managed by the abnormal direction management unit 103 exceeds a threshold, the operator may be notified of this situation. Along with the measurement data in the three-dimensional optical sensor 201, the results of detecting whether there is an abnormality or the like may be sent to the operator. Further, information indicating, for example, the results of detecting an abnormality may be output to an external display device.

As described above, by notifying the operator of the results of detecting an abnormality, data of the abnormal direction or the like, the operator is able to know the presence or the absence of an abnormality, the abnormal direction, the case of the abnormality and the like, and to appropriately determine whether or not the maintenance is necessary.

Figure 17:
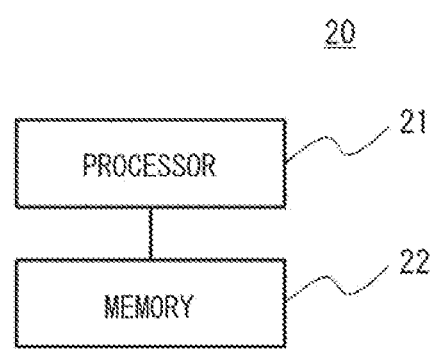
FIG. 17 is a configuration diagram showing an outline of hardware of a computer according to the example embodiments.

Note that each of the configurations in the above example embodiments may be constructed by hardware or software, or both of them. Further, each of the configurations may be formed by one hardware device or one software program, or a plurality of hardware devices or a plurality of software programs. Each apparatus and each function (process) may be implemented by a computer 20 including a processor 21 such as a Central Processing Unit (CPU) and a memory 22, which is a storage apparatus, as shown in FIG. 17. For example, a program (measurement control program) for performing the methods in the example embodiments may be stored in the memory 22 and each function may be achieved by executing, by the processor 21, the program stored in the memory 22.

The programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, semiconductor memories (such as mask ROM, Programmable ROM (PROM), Erasable PROM (EPROM), flash ROM, Random Access Memory (RAM), etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, the present disclosure is not limited to the aforementioned example embodiments and may be changed as appropriate without departing from the spirit of the present disclosure. While the present disclosure has been described with reference to the example embodiments, the present disclosure is not limited to the aforementioned example embodiments. Various changes that may be understood by one skilled in the art may be made to the configurations and the details of the present disclosure within the scope of the present disclosure.

The whole or part of the example embodiment disclosed above can be described as, but not limited to, the following supplementary notes.

(Supplementary Note 1)
A measurement control apparatus comprising:
a detection unit configured to detect an abnormal part of point group data acquired from a three-dimensional optical sensor;
a control unit configured to control the orientation of the three-dimensional optical sensor in accordance with the abnormal part that has been detected; and
a determination unit configured to determine the case of the abnormality of the abnormal part based on the point group data measured by the three-dimensional optical sensor in the controlled orientation.

(Supplementary Note 2)
The measurement control apparatus according to Supplementary Note 1, wherein the determination unit determines the case of the abnormality, in a state in which the orientation of the three-dimensional optical sensor has been changed in accordance with the abnormal part, based on point group data where the direction that corresponds to the abnormal part after the change has been measured.

(Supplementary Note 3)
The measurement control apparatus according to Supplementary Note 2, wherein the determination unit determines, when there is an abnormality in point group data where the direction that corresponds to the abnormal part after the change has been measured, that there is an abnormality in the three-dimensional optical sensor and determines, when there is no abnormality in point group data where the direction that corresponds to the abnormal part after the change has been measured, that there is an abnormality in the target to be measured by the three-dimensional optical sensor.

(Supplementary Note 4)
The measurement control apparatus according to Supplementary Note 1, wherein the determination unit determines the case of the abnormality, in a state in which the orientation of the three-dimensional optical sensor has been changed in accordance with the abnormal part, based on point group data where the direction that corresponds to the abnormal part before the change has been measured.

(Supplementary Note 5)
The measurement control apparatus according to Supplementary Note 4, wherein the determination unit determines, when there is an abnormality in point group data where the direction that corresponds to the abnormal part before the change has been measured, that there is an abnormality in the target to be measured by the three-dimensional optical sensor, and determines, when there is no abnormality in point group data where the direction that corresponds to the abnormal part before the change has been measured, that there is an abnormality in the three-dimensional optical sensor.

(Supplementary Note 6)
The measurement control apparatus according to any one of Supplementary Notes 1 to 5, wherein the detection unit detects the abnormal part based on a plurality of pieces of point group data acquired as a result of a plurality of measurements by the three-dimensional optical sensor.

(Supplementary Note 7)
The measurement control apparatus according to any one of Supplementary Notes 1 to 6, wherein the detection unit detects the abnormal part based on results of comparing point group data measured at a normal time with the acquired point group data.

(Supplementary Note 8)
The measurement control apparatus according to Supplementary Note 7, wherein the detection unit detects whether or not there is an abnormality in the acquired point group data in accordance with the results of the comparison.

(Supplementary Note 9)
The measurement control apparatus according to Supplementary Note 8, wherein the presence or the absence of the abnormality means whether the acquired point group data is missing as compared to the point group data measured at the normal time.

(Supplementary Note 10)
The measurement control apparatus according to Supplementary Note 7, wherein the detection unit detects the abnormal level of the acquired point group data in accordance with the results of the comparison.

(Supplementary Note 11)

The measurement control apparatus according to Supplementary Note 10, wherein the abnormal level is a luminance change level of the acquired point group data as compared to the point group data measured at the normal time.

(Supplementary Note 12)

The measurement control apparatus according to any one of Supplementary Notes 7 to 11, further comprising a management unit configured to manage the results of the comparison by a bit map for each measurement direction of the three-dimensional optical sensor.

(Supplementary Note 13)

The measurement control apparatus according to Supplementary Note 12, comprising managing the results of the comparison by the bit map for each of a plurality of measurement directions of the three-dimensional optical sensor.

(Supplementary Note 14)

The measurement control apparatus according to any one of Supplementary Notes 1 to 13, wherein the control unit changes the orientation of the three-dimensional optical sensor to a direction, of measurement directions in which the abnormal part is not detected, in which the amount of change in the orientation is small.

(Supplementary Note 15)

The measurement control apparatus according to Supplementary Note 14, wherein the control unit changes the orientation of the three-dimensional optical sensor to a direction, of measurement directions in which the abnormal part is not detected, in which the amount of change in the orientation is small in a plurality of measurements by the three-dimensional optical sensor.

(Supplementary Note 16)

The measurement control apparatus according to any one of Supplementary Note 1 to 15, further comprising a correction unit configured to correct point group data of the abnormal part using the point group data measured by the three-dimensional optical sensor in the controlled orientation based on results of determining the case of the abnormality.

(Supplementary Note 17)

The measurement control apparatus according to Supplementary Note 16, wherein the correction unit changes the position of the point group data measured by the three-dimensional optical sensor in the controlled orientation in accordance with the controlled orientation.

(Supplementary Note 18)

The measurement control apparatus according to Supplementary Note 17, wherein the correction unit complements, when the point group data of the abnormal part is missing, the point group data of the abnormal part by point group data measured by the three-dimensional optical sensor in the controlled orientation.

(Supplementary Note 19)

The measurement control apparatus according to Supplementary Note 17, wherein the correction unit adjusts, when the point group data of the abnormal part is not missing, the luminance of the point group data of the abnormal part by the luminance of point group data measured by the three-dimensional optical sensor in the controlled orientation.

(Supplementary Note 20)

The measurement control apparatus according to any one of Supplementary Notes 1 to 19, further comprising an external environment information accepting unit configured to accept external environment information indicating the state of an external environment of the three-dimensional optical sensor, wherein the detection unit detects the abnormal part of the point group data based on the external environment information.

(Supplementary Note 21)

The measurement control apparatus according to Supplementary Note 20, wherein the control unit controls the orientation of the three-dimensional optical sensor based on the external environment information.

(Supplementary Note 22)

The measurement control apparatus according to any one of Supplementary Notes 1 to 21, further comprising a notification unit configured to send results of detection by the detection unit or results of determination by the determination unit.

(Supplementary Note 23)

A measurement system comprising a three-dimensional optical sensor and a measurement control apparatus, wherein the measurement control apparatus comprises:
a detection unit configured to detect an abnormal part of point group data acquired from the three-dimensional optical sensor;
a control unit configured to control the orientation of the three-dimensional optical sensor in accordance with the abnormal part that has been detected; and
a determination unit configured to determine the case of the abnormality of the abnormal part based on the point group data measured by the three-dimensional optical sensor in the controlled orientation.

(Supplementary Note 24)

The measurement system according to Supplementary Note 23, comprising an orientation changing mechanism that changes the orientation of the three-dimensional optical sensor, wherein the control unit controls the orientation changing mechanism so as to change the orientation of the three-dimensional optical sensor.

(Supplementary Note 25)

A measurement control method comprising:
detecting an abnormal part of point group data acquired from a three-dimensional optical sensor;
controlling the orientation of the three-dimensional optical sensor in accordance with the abnormal part that has been detected; and
determining the case of the abnormality of the abnormal part based on the point group data measured by the three-dimensional optical sensor in the controlled orientation.

(Supplementary Note 26)

The measurement control method according to Supplementary Note 25, wherein, in the determination, in a state in which the orientation of the three-dimensional optical sensor has been changed in accordance with the abnormal part, the case of the abnormality is determined based on point group data where the direction that corresponds to the abnormal part after the change has been measured.

(Supplementary Note 27)

A measurement control program for causing a computer to execute processing of:
detecting an abnormal part of point group data acquired from a three-dimensional optical sensor;
controlling the orientation of the three-dimensional optical sensor in accordance with the abnormal part that has been detected; and
determining the case of the abnormality of the abnormal part based on the point group data measured by the three-dimensional optical sensor in the controlled orientation.

(Supplementary Note 28)

The measurement control program according to Supplementary Note 27, wherein, in the determination, in a state in which the orientation of the three-dimensional optical sensor has been changed in accordance with the abnormal part, the case of the abnormality is determined based on point group data where the direction that corresponds to the abnormal part after the change has been measured.

REFERENCE SIGNS LIST

1 Measurement System
2, 3 Target Object
10 Measurement Control Apparatus
11 Detection Unit
12 Control Unit
13 Determination Unit
20 Computer
21 Processor
22 Memory
100 Measurement Control Apparatus
101 Normal Data Holding Unit
102 Measurement Abnormality Detection Unit
103 Abnormal Direction Management Unit
104 Direction Control Unit
105 Measurement Data Correction Unit
106 External Environment Information Accepting Unit
107 Notification Unit
200 Three-dimensional Measurement Apparatus
201 Three-dimensional Optical Sensor
202 Rotation Mechanism
211 Rotation Optical System

What is claimed is:

1. A measurement control apparatus comprising:
at least one memory storing instructions, and
at least one processor configured to execute the instructions stored in the at least one memory to:
detect, by the at least one processor, an abnormal part of point group data acquired from a three-dimensional optical sensor;
control, by the at least one processor, the orientation of the three-dimensional optical sensor in accordance with the abnormal part that has been detected, the orientation of the three-dimensional optical sensor being changed to a direction, of measurement directions in which the abnormal part is not detected, in which the amount of change in the orientation is small; and
determine, by the at least one processor, the cause of the abnormality of the abnormal part based on the point group data measured by the three-dimensional optical sensor in the controlled orientation.

2. The measurement control apparatus according to claim 1, wherein the at least one processor is further configured to execute the instructions stored in the at least one memory to determine the cause of the abnormality, in a state in which the orientation of the three-dimensional optical sensor has been changed in accordance with the abnormal part, based on point group data where the direction that corresponds to the abnormal part after the change has been measured.

3. The measurement control apparatus according to claim 2, wherein the at least one processor is further configured to execute the instructions stored in the at least one memory to determine, when there is an abnormality in point group data where the direction that corresponds to the abnormal part after the change has been measured, that there is an abnormality in the three-dimensional optical sensor and determines, determine, when there is no abnormality in point group data where the direction that corresponds to the abnormal part after the change has been measured, that there is an abnormality in the target to be measured by the three-dimensional optical sensor.

4. The measurement control apparatus according to claim 1, wherein the at least one processor is further configured to execute the instructions stored in the at least one memory to determine the cause of the abnormality, in a state in which the orientation of the three-dimensional optical sensor has been changed in accordance with the abnormal part, based on point group data where the direction that corresponds to the abnormal part before the change has been measured.

5. The measurement control apparatus according to claim 4, wherein the at least one processor is further configured to execute the instructions stored in the at least one memory to determine, when there is an abnormality in point group data where the direction that corresponds to the abnormal part before the change has been measured, that there is an abnormality in the target to be measured by the three-dimensional optical sensor, and determine, when there is no abnormality in point group data where the direction that corresponds to the abnormal part before the change has been measured, that there is an abnormality in the three-dimensional optical sensor.

6. The measurement control apparatus according to claim 1, wherein the at least one processor is further configured to execute the instructions stored in the at least one memory to detect the abnormal part based on a plurality of pieces of point group data acquired as a result of a plurality of measurements by the three-dimensional optical sensor.

7. The measurement control apparatus according to claim 1, wherein the at least one processor is further configured to execute the instructions stored in the at least one memory to detect the abnormal part based on results of comparing point group data measured at a normal time with the acquired point group data.

8. The measurement control apparatus according to claim 7, wherein the at least one processor is further configured to execute the instructions stored in the at least one memory to detect whether or not there is an abnormality in the acquired point group data in accordance with the results of the comparison.

9. The measurement control apparatus according to claim 8, wherein the presence or the absence of the abnormality means whether the acquired point group data is missing as compared to the point group data measured at the normal time.

10. The measurement control apparatus according to claim 7, wherein the at least one processor is further configured to execute the instructions stored in the at least one memory to detect the abnormal level of the acquired point group data in accordance with the results of the comparison.

11. The measurement control apparatus according to claim 10, wherein the abnormal level is a luminance change level of the acquired point group data as compared to the point group data measured at the normal time.

12. The measurement control apparatus according to claim 7, wherein the at least one processor is further configured to execute the instructions stored in the at least one memory to manage the results of the comparison by a bit map for each measurement direction of the three-dimensional optical sensor.

13. The measurement control apparatus according to claim 12, wherein the at least one processor is further configured to execute the instructions stored in the at least one memory to manage the results of the comparison by the bit map for each of a plurality of measurement directions of the three-dimensional optical sensor.

14. The measurement control apparatus according to claim 1, wherein the at least one processor is further configured to execute the instructions stored in the at least one memory to change the orientation of the three-dimensional optical sensor to a direction, of measurement directions in which the abnormal part is not detected, in which the amount of change in the orientation is small in a plurality of measurements by the three-dimensional optical sensor.

15. The measurement control apparatus according to claim 1, wherein the at least one processor is further configured to execute the instructions stored in the at least one memory to correct point group data of the abnormal part using the point group data measured by the three-dimensional optical sensor in the controlled orientation based on results of determining the cause of the abnormality.

16. The measurement control apparatus according to claim 15, wherein the at least one processor is further configured to execute the instructions stored in the at least one memory to change the position of the point group data measured by the three-dimensional optical sensor in the controlled orientation in accordance with the controlled orientation.

17. The measurement control apparatus according to claim 16, wherein the at least one processor is further configured to execute the instructions stored in the at least one memory to complement, when the point group data of the abnormal part is missing, the point group data of the abnormal part by point group data measured by the three-dimensional optical sensor in the controlled orientation.

18. A measurement system comprising a three-dimensional optical sensor and a measurement control apparatus, wherein the measurement control apparatus comprises:

at least one memory storing instructions, and
at least one processor configured to execute the instructions stored in the at least one memory to:
  detect, by the at least one processor, an abnormal part of point group data acquired from the three-dimensional optical sensor;
  control, by the at least one processor, the orientation of the three-dimensional optical sensor in accordance with the abnormal part that has been detected, the orientation of the three-dimensional optical sensor being changed to a direction, of measurement directions in which the abnormal part is not detected, in which the amount of change in the orientation is small; and
  determine, by the at least one processor, the cause of the abnormality of the abnormal part based on the point group data measured by the three-dimensional optical sensor in the controlled orientation.

19. A measurement control method comprising:
detecting, by at least one processor, an abnormal part of point group data acquired from a three-dimensional optical sensor;
controlling, by the at least one processor, the orientation of the three-dimensional optical sensor in accordance with the abnormal part that has been detected, the orientation of the three-dimensional optical sensor being changed to a direction, of measurement directions in which the abnormal part is not detected, in which the amount of change in the orientation is small; and
determining, by the at least one processor, the cause of the abnormality of the abnormal part based on the point group data measured by the three-dimensional optical sensor in the controlled orientation.

* * * * *